April 1, 1958 T. S. MALONEY 2,828,718
CATTLE DUSTING, BACK SCRATCHING AND DEGRUBBING DEVICE
Filed May 19, 1955 2 Sheets-Sheet 1

INVENTOR
T. S. MALONEY
BY Kimmel & Crowell
ATTORNEYS

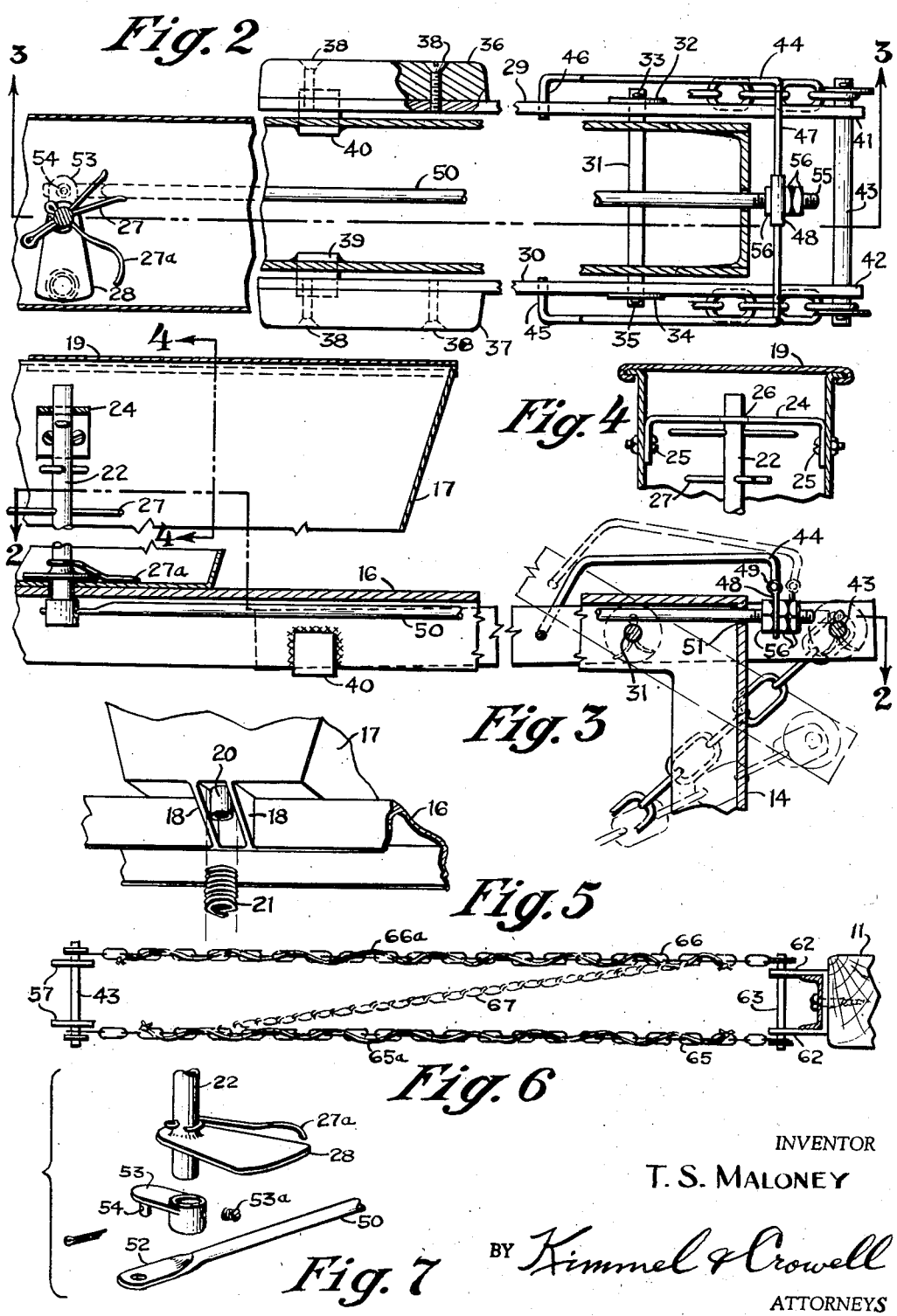

2,828,718

CATTLE DUSTING, BACK SCRATCHING AND DEGRUBBING DEVICE

Thomas S. Maloney, Grand Island, Nebr.

Application May 19, 1955, Serial No. 509,469

1 Claim. (Cl. 119—156)

The present invention relates to devices for applying insecticide dust to the backs of cattle and, more particularly, to such devices which will also scratch their backs and assist in degrubbing the cattle.

The primary object of the invention is to provide a device of the character described which effectively applies an insecticide dust to the backs of cattle and, by providing means for scratching the backs of the cattle, will attract the cattle to make use of the device.

Another object of the invention is to provide a device with these general characteristics which, due to the inclusion of multiple chains, will assist greatly in removing grubs embedded in the skin and hair of the cattle.

A still further object of the invention is to provide an animal dusting device which automatically feeds the dusting material to the backs of the cattle.

Other objects and advantages will become apparent in the following specification when read in the light of the attached drawings in which:

Figure 2 is an enlarged horizontal cross section taken along the line 2—2 of Figure 3 looking in the direction of the arrows with parts broken away;

Figure 3 is an enlarged vertical cross section taken along the line 3—3 of Figure 2 looking in the direction of the arrows;

Figure 4 is a vertical cross section of the hopper taken along the line 4—4 of Figure 3 looking in the direction of the arrows with parts broken away;

Figure 5 is a fragmentary perspective view of the mounting of the hopper on the cross beam;

Figure 6 is a plan view of the back-engaging chains of the device and their attachment to the side rails; and Figure 7 is an exploded perspective of the agitator drive.

Figure 1:
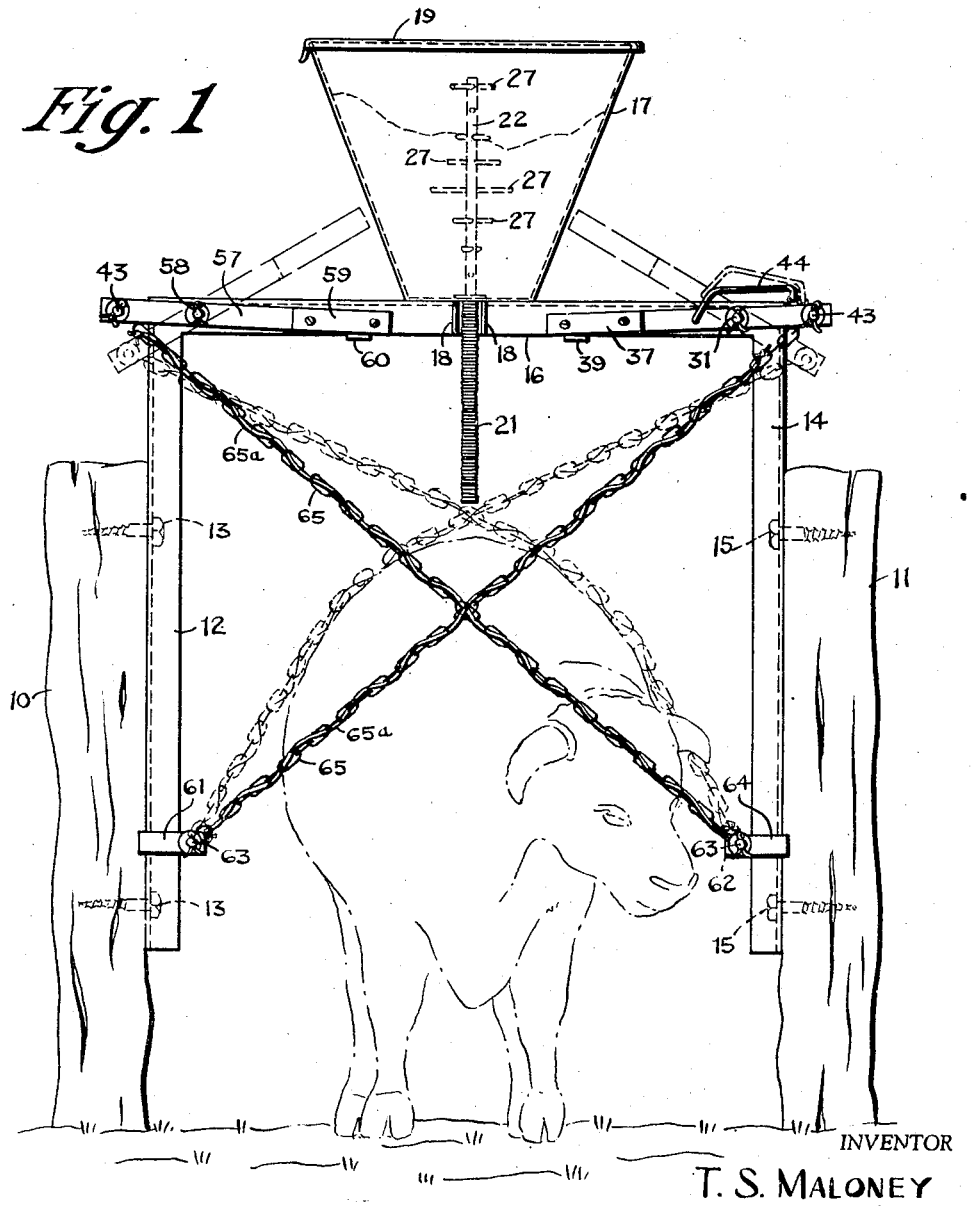
Figure 1 is a front elevation of the invention showing a steer in dotted lines making use of the device.

Now referring to the drawings in detail wherein like numerals indicate like parts throughout the several figures, the reference numeral 10 indicates a post inserted in the ground in the usual manner, and a second post 11 is similarly mounted in spaced apart relation from the post 10 providing a passageway therebetween. A channel 12 is secured to the post 10 by means of lag screws 13 extending therethrough and into the post 10. The channel 12 extends vertically a short distance above the top of the post 10.

A second channel 14 is secured to the post 11 by means of lag screws 15 and extends in parallel relation to the channel 12 to a point above the post 11 in horizontal alignment with the top of the channel 12. A channel beam 16 is secured at its opposite ends to the top of the channel 12 and the top of the channel 14 with the open side of the channel extending downwardly. Thus it can be seen that the channels 12, 14 and the channel beam 16 form a substantially U-shaped framework extending between the posts 10 and 11.

A hopper 17 is positioned on the channel beam 16 and secured thereto by means of angle supports 18 welded to the bottom of the hopper 17 and to the sides of the channel beam 16, as shown in Figure 5. The hopper 17 is provided with a cover 19 and a discharge spout 20. A flexible coil spring 21 engages over the discharge spout 20 and extends downwardly therefrom to form a discharge tube.

A shaft 22 extends vertically in the center of the hopper 17 and is supported at its upper end by means of a bracket 24 extending from the walls of the hopper 17 and secured thereto by means of bolts 25. The bracket 24 is provided with a centrally disposed aperture 26 through which the shaft 22 passes. The lower end of the shaft 22 extends through the bottom wall of the hopper 17 and the bight of the channel 16.

The shaft 22 is further provided with agitating rods 27 which will agitate the contents of the hopper 17, causing it to flow through the discharge spout 20. The discharge spout 20 is covered by means of a valve 28 which is pivoted to the shaft 17 and turns therewith to open the discharge spout when a steer is moving through the device. The valve 28 further acts as a stop to engage the hopper bottom preventing downward movement of shaft 22.

A bottom rod 27a is secured to the shaft 22 so as to contact the bottom of hopper 17 and urge the material therein toward the outlet 20.

A pair of tension arms 29 and 30 are pivotally secured to the channel beam 16 by means of pivot pin 31 extending transversely therethrough. The tension arms 29 and 30 are held on the pivot pin 31 by means of a washer 32 and cotter key 33 at one end and by washer 34 and cotter key 35 at the other end. The inner ends of the tension arms 29 and 30 are provided with weights 36 and 37 which are secured to the arms 29 and 30 respectively by means of attachment bolts 38. A pair of stops 39 and 40 are welded to the channel beam 16 to limit the lower movement of the tension arms 29 and 30. The outer end 41 of the tension arm 29 and the outer end 42 of the tension arm 30 extend laterally beyond the vertically extending channel 14. The outer ends 41 and 42 are connected by a pin 43 extending therebetween.

A generally U-shaped agitator-actuator member 44 is positioned above the tension arms 29 and 30 and is provided with inwardly directed free ends 45 and 46 which engage in a pivotal relation in suitable apertures in the tension arms 29 and 30 respectively. The bight 47 of the U-shaped member 44 is provided with a bracket 48 pivoted at 49 to the U-shaped member 44. A shaft 50 extends laterally of the device under the top of the channel beam 16 and through an aperture 51 in the channel 14. The inner end of the shaft 50 is flattened as at 52. A link 53 is positively connected to the shaft 22 at the lower end thereof by means of a set screw 53a and has its opposite end pivotally connected to the shaft 50 in the flattened portion 52 by means of shaft 54.

The outer end of the shaft 50 is screw-threaded as at 55, and locking nuts 56 are engaged on opposite sides of the bracket 48 to thereby fix the bracket 48 with relation to the shaft 50. Thus it can be seen that upward movement of the tension arms 29 and 30 about pivot 31 will move the U-shaped member 44 outwardly, thus moving the shaft 50, rotating the shaft 22 and opening the valve 28.

A second set of tension arms 57 is pivotally engaged to the channel beam 16 by means of pivot 58 in the same manner as the mounting of the tension arms 29 and 30. A weight 59 is positioned on each of the tension arms 57, and stops 60 are provided to limit the downward movement of the arms 57.

A U-shaped bracket 61 is engaged over the channel 12 with the arms 62 extending inwardly beyond the sides of the channel 12. A pin 63 extends through the free ends of the bracket 61. A second bracket 64 is positioned over the channel 14 in horizontal alignment with the bracket 61. The arms 62 of the bracket 64 extend inwardly beyond the sides of the channel 14 and are likewise connected by a pin 63 extending therebetween.

A chain 65 extends from the pin 63 in the bracket 61 to the pin 43 in the tension arm 30. A second chain 66 extends from the opposite end of the pin 63 in parallel relation to the chain 65 and engages the opposite end of the pin 43 extending through the tension arm 29. The tension arm 57 is provided at its outer end with a pin 43 in the same manner as the pin 43 engages the tension arms 29 and 30. A second pair of chains 65 and 66 extend between the pin 43 of the tension arms 57 and the pin 63 of the bracket 64 in the same manner as described for the first pair of chains 65 and 66.

A diagonal back-scratching chain 67 extends between the chains 65 and 66 at a point adjacent the opposite ends of the chains. The chain 67 is of the variety of chain known as the lock-link type chain. A rope 65a is threaded through the chains 65, and a rope 66a is threaded through the chains 66 for increasing the scratching effect.

In the use and operation of the invention, a steer having a back that itches due to grubs, insects and other parasites passes under the chains 65, 66 and 67 of the device in order to scratch his back and thus gain the comfort conversant therewith. The act of moving under the chains 65, 66 and 67 will cause them to be bowed upwardly as shown in Figure 1, thus raising the weighted ends of the tension arms 29, 30 and 57 which act to maintain the tension of the chains and at the same time cause the agitator 22 to rotate in the hopper 17 and the valve 28 to uncover the discharge opening 20, thus feeding a charge of insecticide material onto the back of the steer through the flexible spring 21. It can be readily seen that the chain links will act to not only distribute the insecticide dust into the hair of the steer but also curry grubs and parasites from the skin of the steer.

Having thus described the preferred embodiment of the invention, it should be understood that numerous modifications and structural adaptations may be made without departing from the scope of the appended claims.

I claim:

In an animal duster and back scratcher having a pair of uprights, a cross member, opposed pairs of pivoted chain-tension arms, two pairs of crossed-chains, each having one end secured to one of the uprights and the other end secured to one of the pairs of tension arms, a dusting material container disposed centrally of said cross member, and a dusting material conduit leading from said container; an agitator shaft extending through said cross member upwardly into said container, an apertured bracket secured inside said container for supporting said agitator shaft at the upper end portion of the latter, a bottom rod secured to said agitator shaft near the lower end portion of the latter in contact with the bottom of said container to urge material in the latter toward said conduit, a rod connected with said other end of said shaft, positioned under said cross member and extending outwardly through one of said uprights centrally of the transverse portion of the latter, a generally U-shaped agitator actuator member having a bight portion and arms each having their free ends inwardly inwardly directed towards each other and each extending into one of a pair of said tension arms, and a bracket connecting said rod with said bight portion, whereby when said tension arms are rocked on their pivots, said rod will actuate said agitator shaft.

References Cited in the file of this patent

UNITED STATES PATENTS

| | | |
|---|---|---|
| 2,316,932 | Bruce | Apr. 20, 1943 |
| 2,632,063 | Peterson | Mar. 17, 1953 |
| 2,697,415 | Peterson | Dec. 21, 1954 |